(12) United States Patent  
Harrington et al.

(10) Patent No.: US 7,872,572 B2  
(45) Date of Patent: Jan. 18, 2011

(54) METHOD AND SYSTEM FOR VEHICLE MOUNTED INFRARED WAVELENGTH INFORMATION DISPLAYS FOR TRAFFIC CAMERA VIEWERS

(75) Inventors: Nathan J. Harrington, Cary, NC (US); Harry L. Hoots, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/212,227

(22) Filed: Sep. 17, 2008

(65) Prior Publication Data

US 2010/0066563 A1    Mar. 18, 2010

(51) Int. Cl.  
*B60Q 1/26* (2006.01)

(52) U.S. Cl. ............. 340/468; 340/815.45; 340/815.52; 340/472; 705/14.62; 705/14.63; 40/591

(58) Field of Classification Search ................. 340/468, 340/815.45, 815.5, 815.52, 815.53, 425.5, 340/472; 40/591, 590, 588, 592; 362/493, 362/812, 487; 345/39, 53; 701/117; 705/14.4, 705/14.62, 14.63

See application file for complete search history.

(56) References Cited

U.S. PATENT DOCUMENTS

| | | | | |
|---|---|---|---|---|
| 6,060,993 | A | * | 5/2000 | Cohen ..................... 340/691.6 |
| 6,812,851 | B1 | | 11/2004 | Dukach et al. |
| 7,121,700 | B1 | | 10/2006 | Scanlon |
| 7,347,017 | B2 | | 3/2008 | Shaffer et al. |
| 7,449,998 | B1 | * | 11/2008 | Au et al. ..................... 340/468 |
| 2006/0265922 | A1 | | 11/2006 | Shaffer |

FOREIGN PATENT DOCUMENTS

WO    WO 2008157618 A2 * 12/2008

* cited by examiner

*Primary Examiner*—Toan N Pham  
(74) *Attorney, Agent, or Firm*—John Pivnichny; Roberts Mlotkowski Safran & Cole, P.C.

(57) ABSTRACT

Systems and methods for vehicle mounted infrared wavelength information displays for traffic camera viewers are disclosed. A method includes obtaining vehicle positioning data associated with at least one vehicle and, based upon the vehicle positioning data, selectively emitting infrared wavelength light from a set of a plurality of light emitting diodes (LEDs) arranged on exterior surfaces of the at least one vehicle.

20 Claims, 6 Drawing Sheets

The invention generally relates to systems and methods for displaying information, and more particularly to systems and methods for vehicle mounted infrared wavelength information displays for traffic camera viewers.

METHOD AND SYSTEM FOR VEHICLE MOUNTED INFRARED WAVELENGTH INFORMATION DISPLAYS FOR TRAFFIC CAMERA VIEWERS

FIELD OF THE INVENTION

The invention generally relates to systems and methods for displaying information, and more particularly to systems and methods for vehicle mounted infrared wavelength information displays for traffic camera viewers.

BACKGROUND

Conventional on-road advertising schemes generally focus on large billboard-style trucks that move through heavily trafficked areas for maximum consumer visibility. Known solutions such as billboards on the side of the road or advertisements placed on the side of trucks or other vehicles reach a very limited audience.

Traffic cameras are most often placed with a view of as much of the road surface as possible. Conventional types of on-vehicle advertisements are generally large enough to only provide information when the vehicle is very close to the camera. It is very difficult (if not impossible) to ensure the traffic camera takes a "snapshot" when a vehicle is within useful visible range.

Accordingly, there exists a need in the art to overcome the deficiencies and limitations described hereinabove.

SUMMARY

In a first aspect of the invention, there is a method comprising obtaining vehicle positioning data associated with at least one vehicle. The method also comprises, based upon the vehicle positioning data, selectively emitting infrared wavelength light from a set of a plurality of light emitting diodes (LEDs) arranged on exterior surfaces of the at least one vehicle.

In another aspect of the invention, there is a method comprising providing a computer infrastructure that operates to: determine a plurality of light emitting diodes (LEDs) to activate, wherein the plurality of LEDs are arranged on at least one vehicle; and cause the plurality of LEDs to emit infrared wavelength light to display a message that is detectable by traffic cameras.

In another aspect of the invention, there is a system comprising a plurality of light emitting diodes (LEDs) arranged on at least one exterior surface of at least one vehicle. The system also comprises a controller that selectively activates a first set of the plurality of LEDs to display a first message based upon: initial vehicle positioning data associated with the at least one vehicle; LED position data; LED range data; and camera position data.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
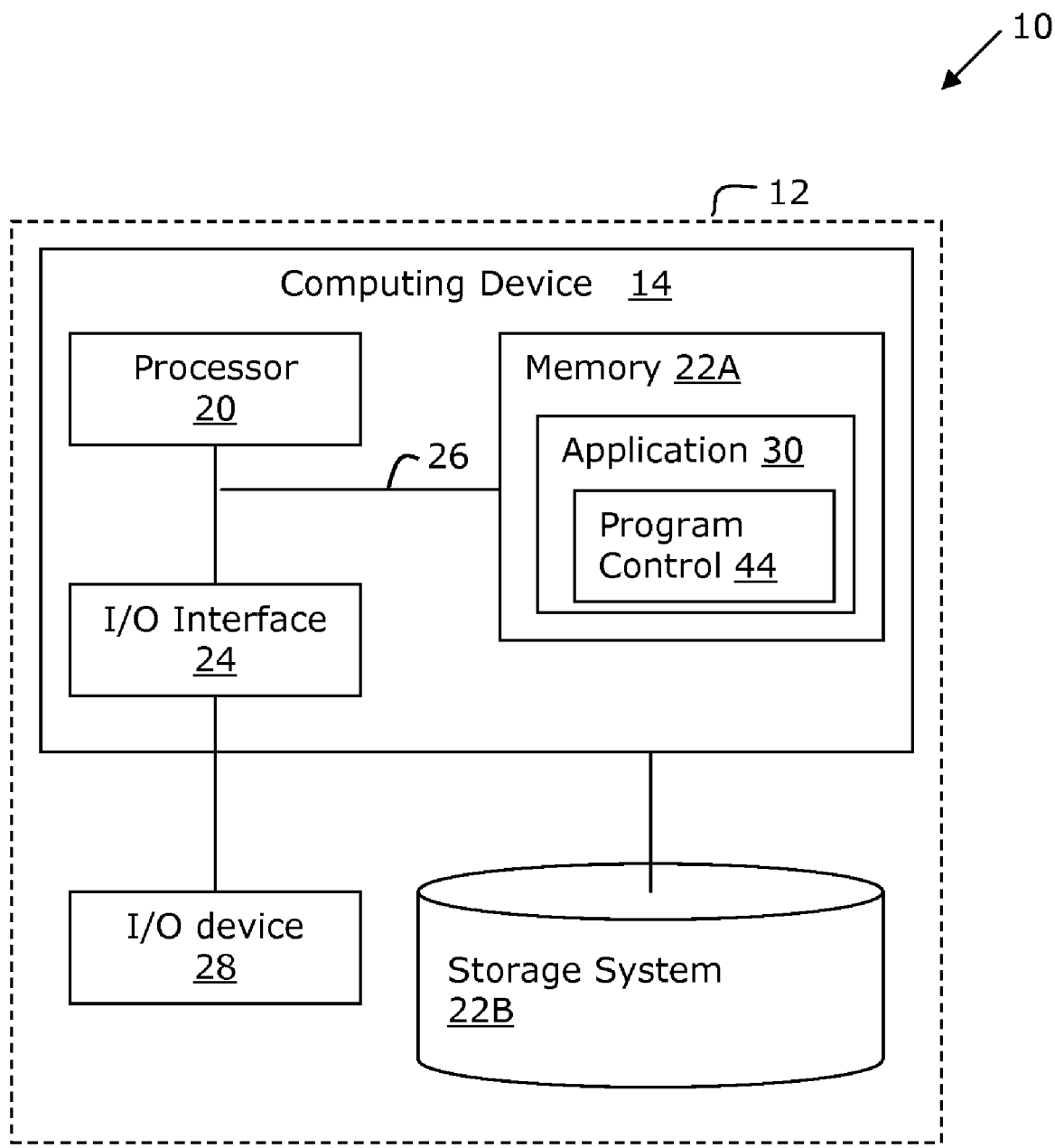
FIG. 1 shows an illustrative environment for implementing the steps in accordance with aspects of the invention.

The invention generally relates to systems and methods for displaying information, and more particularly to systems and methods for vehicle mounted infrared wavelength information displays for traffic camera viewers. According to aspects of the invention, a plurality of infrared-wavelength light emitting diodes (LEDs) is arranged on exterior surfaces of a vehicle. In embodiments, the vehicle also comprises a positioning system (e.g., global positioning system) and an onboard controller. The controller, based upon position information of the vehicle and position information of a traffic camera, selectively actuates ones of the plurality of LEDs to display a message to the traffic camera. The message might include, for example, letters, words, slogans, etc., formed by the selectively actuated LEDs. In this manner the message will be included in a video feed or still image captured from the traffic camera, which might be viewed by thousands of people. Accordingly, implementations of the invention are useful for providing advertising.

Embodiments of the invention provide reliable method of ensuring that a message is displayed to viewers of a traffic camera. Moreover, the mounting of infrared wavelength LEDs on a display vehicle should not require special dispensation in traffic laws, since the optical output of infrared wavelength LEDs is not detectable by humans (but is detectable through digital cameras, such as traffic cameras). Implementations of the invention utilize positioning technology to provide a scaled display of messages on one or more vehicles to more readily ensure traffic cameras' capturing of displayed messages. In this manner, one or more vehicles may be used to deliver a wide range of information at relatively low cost.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, and/or a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein, such as, for example, providing advertising messages to traffic cameras by selectively actuating LEDs on vehicles.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24.

The bus 26 provides a communications link between each of the components in the computing device 14.

The computing device 14 can comprise any general purpose computing article of manufacture capable of executing computer program code installed thereon (e.g., a personal computer, server, wireless notebook, smart telephone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a primary service provider, such as a Solution Integrator, could offer to perform the processes described herein. In this case, the primary service provider can create, maintain, deploy, support, etc., a computer infrastructure that performs the process steps of the invention for one or more customers. In return, the primary service provider can receive payment from the customer(s) under a subscription and/or fee agreement and/or the primary service provider can receive payment from the sale of advertising content to one or more third parties.

Figure 2:
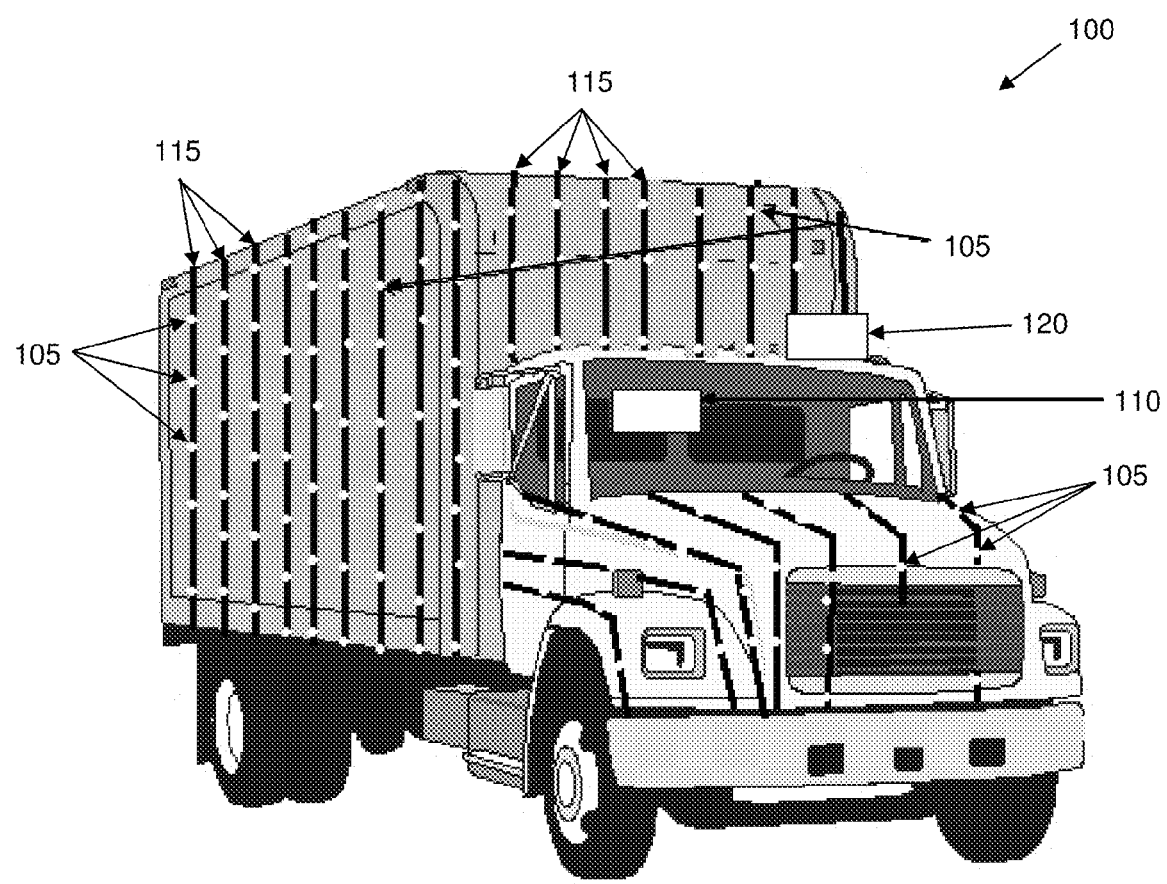
FIG. 2 shows a display vehicle according to aspects of the invention.

FIG. 2 shows an exemplary system according to aspects of the invention. In embodiments, the system includes a vehicle 100, such as, for example, a truck, car, towed trailer, etc. A plurality of infrared wavelength LEDs 105 are disposed on exterior surfaces of the vehicle 100. The LEDs 105 may be arranged in any desired pattern on any surfaces of the vehicle 100. In embodiments, each LED 105 is individually controllable and may be of any desired size, shape, and intensity, according to the intended use(s) of the system. Because the LEDs 105 are individually actuatable, they may be used to provide a changeable dot-matrix-style display of infrared wavelength light. Moreover, although the invention is described with respect to infrared wavelength light, the LEDs 105 are not limited to infrared wavelength; rather, LEDs of any desired wavelength may be used so long as the light emitted by the LEDs 105 is invisible to humans but visible to traffic cameras. LEDs are known, such that further explanation is no believed necessary.

In embodiments, the LEDs 105 are operatively connected to a controller 110, which may comprise a computing device such as, for example, computing device 14 described above with respect to FIG. 1. According to aspects of the invention, the controller 110 sends activation signals to ones of the plurality of LEDs 105, which activation signals cause the selected LEDs 105 to "turn on" to emit infrared wavelength light. Similarly, the controller 110 is configured to send control signals to selected LEDs to "turn off" (e.g., stop emitting). In embodiments, the LEDs 105 are operatively connected to the controller 110 by conductive lines 115, such as, for example, electrical wires. Additionally or alternatively, actuation signals may be transmitted from the controller 110 to the LEDs 105 by way of wireless communication, e.g., using conventional wireless communication techniques and protocols.

The LEDs 105 may be individually powered (e.g., by an individual battery associated with each respective LED), powered by the vehicle power system (e.g., vehicle battery, alternator, etc.), or powered by a stand-alone power system (e.g., battery pack, generator, etc.). Power for operating the LEDs 105 may be provided through the conductive lines 115 or other similar wiring.

Still referring to FIG. 2, the system may further comprise a positioning system 120, such as, for example, a global positioning system (GPS) receiver. Conventional GPS-based positioning systems that operate to determine the geographic position (e.g., coordinates, e.g., longitude and latitude), orientation (e.g., heading), and velocity (e.g., speed) of a vehicle are known, such that further explanation is not believed necessary. In embodiments, the positioning system 120 determines the position, orientation, and velocity data of the vehicle 100 (e.g., vehicle positioning data), and communicates this vehicle positioning data to the controller 110 (e.g., via wired or wireless data transfer between the positioning system 120 and the controller 110).

According to aspects of the invention, the controller 110 stores or has access to data defining a precise location of each one of the LEDs 105 at the vehicle 100. For example, data defining the x-y-z coordinates of each LED 105 in a local coordinate system (e.g., relative to an origin on the vehicle 100) may be stored in memory (e.g., memory 22A and/or storage system 22B, described in FIG. 1) that is included in or accessible by the controller 110. Such LED position data may be obtained (e.g., by measurement) when the plurality of LEDs 105 are arranged on the vehicle 100.

According to further aspects of the invention, the controller 110 stores or has access to data defining a transmission range of each one of the LEDs 105. For example, data defining a range (e.g., distance) over which light emitted by each LED 105 can be detected by a digital camera (e.g., traffic camera) may be stored in memory (e.g., memory 22A and/or storage system 22B, described in FIG. 1) that is included in or accessible by the controller 110. Such LED range data may be empirically obtained (e.g., by measurement), estimated, or gathered from the design specification of each LED 105.

According to even further aspects of the invention, the controller 110 stores or has access to data defining a precise location of at least one traffic camera. For example, data defining the geographic location (e.g., coordinates, e.g., longitude and latitude) and the angle of view of a traffic camera may be stored in memory (e.g., memory 22A and/or storage system 22B, described in FIG. 1) that is included in or accessible by the controller 110. Such traffic camera position data may be determined, for example, through records associated with traffic cameras, by performing actual position measurements of traffic cameras, and/or by estimating the position and angle of view of traffic cameras.

In embodiments, the controller 110 comprises appropriate programming (e.g., application 30 and/or program control 44, as described in FIG. 1) to determine, based upon the vehicle positioning data, the LED position data, the LED range data, and the traffic camera position data, which ones of the LEDs 105 to activate in order to display a predefined message to a traffic camera. For example, based upon the vehicle positioning data, the LED position data, the LED range data, and the traffic camera position data, the controller 110 may determine that a particular subset of the plurality of LEDs 105 is viewable by a traffic camera, and may send actuation signals to selected ones of that subset to emit infrared wavelength light, thereby creating a dot-matrix-style pattern of light that will be captured by the traffic camera.

Figure 3:
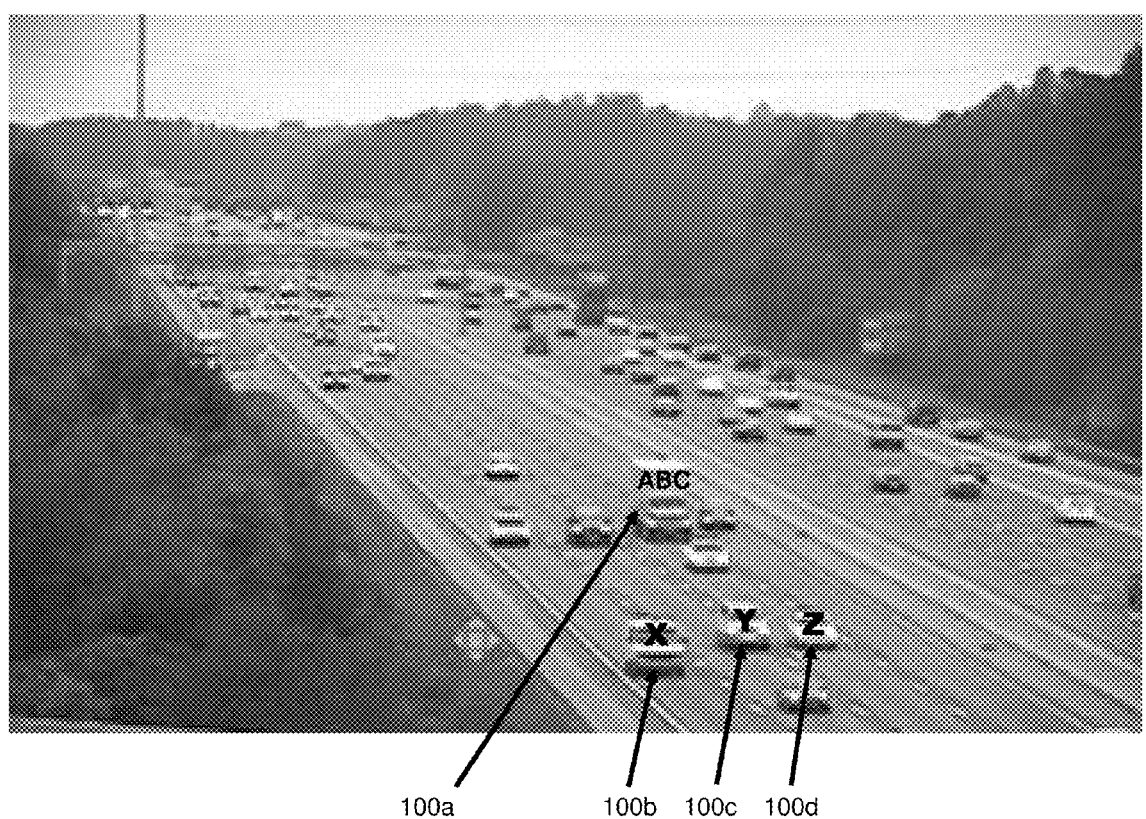
FIGS. 3-5 shows exemplary traffic camera images according to aspects of the invention.

For example, as depicted in FIG. 3, which represents an exemplary view of a traffic camera according to aspects of the invention, the controller aboard vehicle 100a causes actuation of a pattern of LEDs in the form of the characters "ABC." Vehicle 100a is similar to vehicle 100 described with respect to FIG. 1. In this particular example, the controller has determined from the vehicle positioning data, the LED position data, the LED range data, and the traffic camera position data that a side and front surface of the vehicle 100a are viewable by the traffic camera. Based upon this determination, the controller has actuated particular ones of the LEDs on the vehicle 100a to spell out "ABC" on the side and front exterior surfaces of the vehicle 100a. The infrared wavelength light emitted by the LEDs is captured by the traffic camera (along with the visible light), such that a person viewing this shot from the camera (e.g., on the Internet or on television) will see the message "ABC."

The invention is not limited to the pattern "ABC," but rather, any pattern may be defined by the arrangement and selective actuation of the LEDs on a vehicle. For example, the LEDs may be selectively actuated to display one or more letters, numbers, symbols, words, slogans, sentences, pictures, animations, etc., within the scope of the invention. Moreover, a plurality of different messages may be pre-defined and stored in the controller.

Also shown in FIG. 3 is a plurality of vehicles 100b, 100c, 100d, cooperating to display a message. More specifically, vehicle 100b is selectively actuating LEDs to produce the letter "X," vehicle 100c is selectively actuating LEDs to produce the letter "Y," and vehicle 100d is selectively actuating LEDs to produce the letter "Z." Each vehicle 100b-d is similar to vehicle 100 described with respect to FIG. 1. In embodiments, in the multiple vehicle configuration such as that depicted in FIG. 2, one of the vehicles (e.g., 100b) is designated as a primary display vehicle, and the other vehicles (e.g., 100c and 100d) are designated as secondary display vehicles.

According to aspects of the invention, each vehicle 100b-d is configured with short-range, high speed wireless communication. For example, the controller (e.g., controller 110) of one vehicle may wirelessly transmit to and receive data from the controller (e.g., controller 110) of another vehicle using conventional wireless hardware and protocol (e.g., IEEE 802.11a/b/g/n, 802.15.1, etc.). In embodiments of the invention, the respective controllers of the secondary vehicles (e.g., 100c and 100d) transmit the vehicle positioning data, the LED position data, the LED range data of the secondary vehicles to the controller of the primary vehicle (e.g., 100b).

The controller of the primary vehicle, by receiving data from the secondary vehicles and by obtaining its own data, possesses a data definition of all of the LEDs of the plurality of vehicles (e.g., 100b-d). Accordingly, in embodiments, the controller of the primary vehicle determines a subset of LEDs to activate from all of the LEDs of the plurality of vehicles. The determination of the subset of LEDs to activate is based upon: (i) the vehicle positioning data, the LED position data, the LED range data of the primary vehicle; (ii) the vehicle positioning data, the LED position data, the LED range data of the secondary vehicles; and (iii) the traffic camera position data.

In accordance with aspects of the invention, after determining the subset of LEDs to activate, the controller of the primary vehicle wirelessly sends data to each of the controllers of the secondary vehicles, the data defining which of the LEDs on each respective secondary vehicle (if any) should be activated. The respective controllers of the secondary vehicles then send actuation signals to the appropriate LEDs based upon the data received form the primary vehicle. In this manner, a plurality of vehicles may cooperate to display a message to a traffic camera. Although three vehicles are shown (e.g., 100b-d), any number of vehicles may be used in a multiple vehicle configuration within the scope of the invention.

In embodiments, the determination of which LEDs to activate may be changed as the vehicle (e.g., 100a) or plurality of vehicles (e.g., 100b-d) change position with respect to the position of a traffic camera. For example, the controller may be configured to make a new determination each time new data is received from the positioning system (e.g., positioning system 120, described above with respect to FIG. 1). In this manner, different subsets of LEDs may be activated (and de-activated) as different LEDs of the vehicle(s) come within the field of view of the traffic camera. This updating allows for a scaled display of information based on the movement of the vehicle(s) through the field of view of the traffic camera. For example, this updating allows for real time updates to automatically activate/deactivate the LEDs of the vehicle(s) to compensate for varying geographies and/or traffic irregularities.

Figure 4:
Figure 5:

FIGS. 4 and 5 depict exemplary views of a traffic camera according to aspects of the invention, and demonstrate examples of the above-described scaling feature. FIG. 4 shows an example of a multiple vehicle configuration in which the plurality of display vehicles are in the far field of the traffic camera. Because the vehicles are far away from the traffic camera, the controller of the primary vehicle causes each secondary vehicle to activate some LEDs to illuminate a small portion of a message 150 (e.g., "XYZ") that extends across many vehicles.

FIG. 5 shows an example of a multiple vehicle configuration in which the plurality of display vehicles are in the near field of the traffic camera. Because the vehicles are close to the traffic camera, the controller of the primary vehicle causes each vehicle to activate some LEDs to illuminate an entire letter of a message 155 (e.g., "XYZ").

Figure 6:
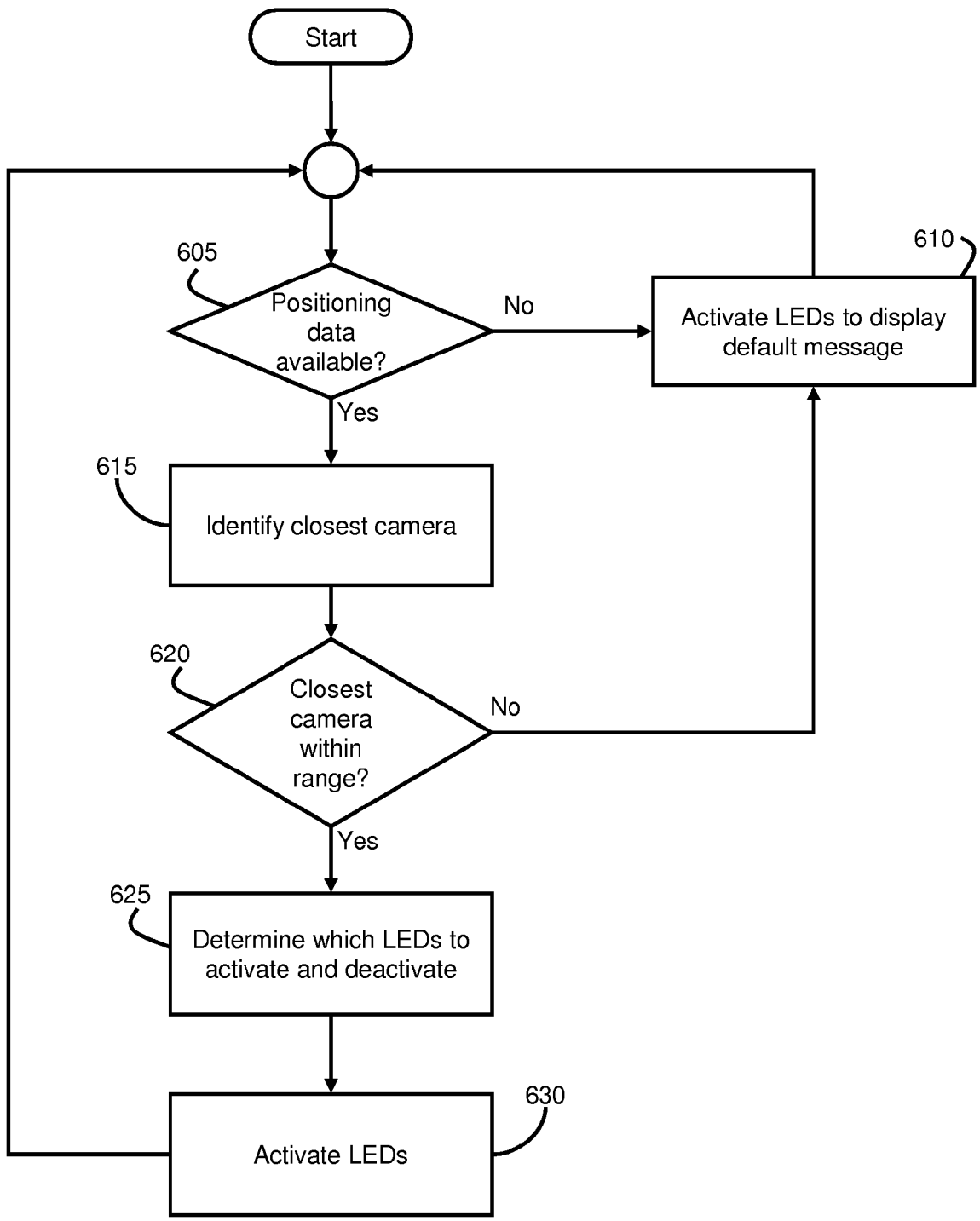
FIG. 6 shows a flow diagram depicting implementations of methods according to aspects of the invention.

FIG. 6 shows a flow diagrams implementing aspects of the invention. The steps of the flow diagram described herein may be implemented in the environments of FIGS. 1 and/or 2. The steps of the flow diagram may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

For example, in particular embodiments, the invention can take the form of a computer program product comprising a tangible computer-readable medium having a computer program embodied in the medium. The computer program, when executed on a computing device, causes the computing device to perform at least one of the functions and/or processes described herein.

FIG. 6 may equally represent high-level block diagrams of the invention. The flowchart and/or block diagrams in FIG. 6 illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

More specifically, FIG. 6 shows a flow diagram depicting steps of a method for vehicle mounted infrared wavelength information displays for traffic camera viewers, according to aspects of the invention. At step 605, the controller (e.g., controller 110 described above) determines whether positioning data (e.g., GPS-based positioning data, described above) is available for the display vehicle (e.g., vehicle 100, described above). For example, if the controller has not received vehicle positioning data from the positioning system (e.g., positioning system 120, described above) for a predetermined amount of time, then it is presumed that positioning data is not available. In this case, at step 610, the controller sends activation signals to selected ones of the LEDs (e.g., LEDs 105) to display a default message.

However, if positioning data is available at step 605, then at step 615 the controller determines the closest traffic camera to the vehicle. For example, the controller may access a stored list of traffic camera positions and, based upon the vehicle position, determine which of the known traffic cameras is closest to the vehicle.

At step 620, the controller determines whether the traffic camera designated in step 615 is within range of the LEDs of the vehicle. For example, based upon the vehicle positioning data, the LED position data, the LED range data, and the traffic camera position data, the controller determines whether the closest traffic camera is within range of the LEDs. If the determination at step 620 is no, then the default message is displayed at step 610. In embodiments, the method returns to step 605 after step 610.

If the determination at step 620 is yes (e.g., the closest camera is within range), then at step 625 the controller determines which of the LEDs on the vehicle to turn on and which to turn off, based upon: the vehicle positioning data, the LED position data, the LED range data, the traffic camera position data, and the image to be displayed. This may be performed as described above with respect to FIGS. 2-5.

At step 630, the controller sends activation signals to turn on and/or turn off the appropriate LEDs, based upon the determination from step 625. In this manner, selected ones of the LEDs are turned on to emit infrared wavelength light in a predefined pattern within the filed of view of the traffic camera, such that anyone viewing the imagery from the traffic camera will see the pattern. In embodiments, the method returns to step 605 after step 630, such that the display may be updated based upon new vehicle positioning data.

Although the method of FIG. 6 is described with respect to a single display vehicle, similar methods may be employed with a plurality of display vehicles. In the multiple vehicle configuration, the method includes steps of transmitting vehicle positional data from secondary vehicles to a primary vehicle, and transmitting LED activation data from the primary vehicle to the secondary vehicles.

Examples of Operation

In a first example of operation of the above-described system and method, a single display vehicle (e.g., vehicle 100a) heads out on the highway to begin a message display run. An on-board GPS (e.g., positioning system 120) reports the display vehicle's positioning data to the controller (e.g., controller 110), and the controller determines the closest traffic camera to the display vehicle's current coordinates. Based on the current configuration of LED emitters on the display vehicle, the closest camera is determined to not be within display range, and a default message is displayed. In embodiments, default messages are displayed when the display vehicle is not within range of a known camera to maximize the possibility of a message being picked up by a traffic camera not in the controller's database.

Still referring to the first example, as the vehicle moves and the GPS coordinates of the display vehicle are continuously updated, the closest traffic camera eventually comes within range, allowing for a message to be configured specifically for that camera. When the display vehicle is initially in the far field of the camera (e.g., one mile away), the controller activates certain ones of the LEDs to show a first message (such as "ABC"). As the display vehicle moves closer to the traffic camera (e.g., into the near field), such that the exterior surfaces of the display vehicle occupy a large part of the filed of view of the camera, the controller activates a different subset of LEDs to display a second, longer message (e.g., "Buy ABC"). This automatic reconfiguration of the display makes it more likely that a still image capture of the traffic camera image contains an effective message from the display vehicle.

In a second example, a plurality of display vehicles enters a highway in close proximity to each other (e.g., at rush hour, when traffic is moving slow). One of the display vehicles is designated as the primary display vehicle, and receives GPS position updates from its own antenna, as well as updates on the position of the other trucks in the display fleet via wireless networking. When the display vehicles are far away from the traffic camera, the primary display vehicle sends data to each of the secondary vehicles, such that the plurality of vehicles coordinate to display a first message. As the primary and secondary vehicles move closer to the traffic camera, the initial display of just a few letters across multiple vehicles is changed to display a single letter per vehicle, and finally multiple letters per vehicle. Regardless of when the traffic camera actually snaps an image, or when the video feed is shown on live television, a useful image will be shown through the automatic scaling of displayed information across multiple vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method, comprising:
   obtaining vehicle positioning data associated with at least one vehicle; and
   based upon the vehicle positioning data, selectively emitting infrared wavelength light from a set of a plurality of light emitting diodes (LEDs) arranged on exterior surfaces of the at least one vehicle.

2. The method of claim 1, wherein the vehicle positioning data comprises a geographic location of the at least one vehicle.

3. The method of claim 2, wherein the vehicle positioning data further comprises a heading and a velocity of the at least one vehicle.

4. The method of claim 1, wherein the selectively emitting comprises determining the set.

5. The method of claim 4, wherein the determining the set is based upon the vehicle positioning data, LED position data, LED range data, and camera position data.

6. The method of claim 5, wherein the camera position data includes geographic location and viewing angle of at least one traffic camera.

7. The method of claim 5, wherein the LED position data, the LED range data, and the camera position data are stored in memory that is accessible by a controller that performs the determining.

8. The method of claim 1, wherein:
the at least one vehicle comprises at least two vehicles, and
the plurality of LEDs are arranged on exterior surfaces of the at least two vehicles.

9. The method of claim 8, wherein the set of the plurality of LEDs comprises:
a first group of LEDs arranged on a first one of the at least two vehicles, and
a second group of LEDs arranged on a second one of the at least two vehicles.

10. The method of claim 1, further comprising:
obtaining updated vehicle positioning data associated with the at least one vehicle; and
based upon the updated vehicle positioning data, selectively emitting infrared wavelength light from a another set of the plurality of LEDs.

11. The method of claim 10, wherein:
the set defines a first message, and
the another set defines a second message different from the first message.

12. The method of claim 10, wherein:
the set defines a message arranged at a first scale, and
the another set defines the message arranged at a second scale different from the first scale.

13. The method of claim 1, wherein a service provider at least one of creates, maintains, deploys and supports a computer infrastructure that performs at least one of the steps of claim 1.

14. The method of claim 1, wherein at least one of the steps of claim 1 are provided by a service provider under a subscription and/or fee agreement and/or based on advertising content to one or more third parties.

15. A method, comprising:
providing a computer infrastructure that operates to:
determine a plurality of light emitting diodes (LEDs) to activate, wherein the plurality of LEDs are arranged on at least one vehicle; and
cause the plurality of LEDs to emit infrared wavelength light to display a message that is detectable by traffic cameras.

16. The method of claim 15, wherein the determining is based on: vehicle positioning data associated with the at least one vehicle; LED position data; LED range data; and camera position data.

17. The method of claim 15, wherein a service provider at least one of creates, maintains, deploys and supports the computer infrastructure.

18. The method of claim 15, wherein the computer infrastructure comprises hardware and software.

19. A system, comprising:
a plurality of light emitting diodes (LEDs) arranged on at least one exterior surface of at least one vehicle; and
a controller that selectively activates a first set of the plurality of LEDs to display a first message based upon: initial vehicle positioning data associated with the at least one vehicle; LED position data; LED range data; and camera position data.

20. The system of claim 19, wherein the controller selectively activates a second set of the plurality of LEDs to display a second message based upon: updated vehicle positioning data associated with the at least one vehicle; the LED position data; the LED range data; and the camera position data.

* * * * *